(12) United States Patent
Matthews et al.

(10) Patent No.: US 12,451,143 B2
(45) Date of Patent: Oct. 21, 2025

(54) SYSTEMS AND METHODS FOR IDENTIFYING USERS BASED ON VOICE DATA AND MEDIA CONSUMPTION DATA

(71) Applicant: Adeia Guides Inc., San Jose, CA (US)

(72) Inventors: Sean Matthews, Los Altos, CA (US); Benjamin H. Maughan, Pleasanton, CA (US); Kevin B. Lenhart, Campbell, CA (US)

(73) Assignee: Adeia Guides Inc., San Jose, CA (US)

( * ) Notice: Subject to any disclaimer, the term of this patent is extended or adjusted under 35 U.S.C. 154(b) by 121 days.

(21) Appl. No.: 18/239,619

(22) Filed: Aug. 29, 2023

(65) Prior Publication Data

US 2023/0402042 A1  Dec. 14, 2023

Related U.S. Application Data

(63) Continuation of application No. 17/154,571, filed on Jan. 21, 2021, now Pat. No. 11,798,565, which is a
(Continued)

(51) Int. Cl.
*G10L 17/22* (2013.01)
*G10L 17/00* (2013.01)
(Continued)

(52) U.S. Cl.
CPC .............. *G10L 17/22* (2013.01); *G10L 17/00* (2013.01); *G10L 17/02* (2013.01); *G10L 17/04* (2013.01); *G10L 17/06* (2013.01)

(58) Field of Classification Search
CPC ......... G10L 17/22; G10L 17/00; G10L 17/02; G10L 17/04; G10L 17/06; G10L 15/22;
(Continued)

(56) References Cited

U.S. PATENT DOCUMENTS 6,239,794 B1    5/2001   Yuen et al.
6,564,378 B1    5/2003   Satterfield et al.
(Continued)

FOREIGN PATENT DOCUMENTS

CA      2644237 A1    9/2007
CN    102404287 A     4/2012
(Continued)

OTHER PUBLICATIONS

PCT International Search Report, International Application No. PCT/US2017/068581, Sep. 10, 2018 (14 pages).

*Primary Examiner* — Linda Wong
(74) *Attorney, Agent, or Firm* — HALEY GUILIANO LLP

(57) ABSTRACT

Systems and methods are disclosed herein for identifying users based on voice data and media consumption data. A media guidance application may generate a voice signature from the user's input and based on that signature identify some demographic characteristics of the user (e.g., age, gender, and other suitable characteristics). The media guidance application may retrieve user data for users that are associated with a household of the user and attempt to identify which of the users spoke the command. If multiple users are identified, based on the demographic characteristics, the media guidance application may use the content of the voice command (e.g., a type of media requested) to identify the user.

20 Claims, 7 Drawing Sheets

Related U.S. Application Data continuation of application No. 16/308,620, filed as application No. PCT/US2017/068581 on Dec. 27, 2017, now Pat. No. 10,937,431.

(51) Int. Cl.
*G10L 17/02* (2013.01)
*G10L 17/04* (2013.01)
*G10L 17/06* (2013.01)

(58) Field of Classification Search
CPC ........ G10L 15/14; H04H 60/45; H04H 60/65; G06F 16/242; G06F 16/248; G06F 16/9535
See application file for complete search history.

(56) References Cited

U.S. PATENT DOCUMENTS

| | | | |
|---|---|---|---|
| 6,681,205 B1 * | 1/2004 | San Martin | G10L 17/24 704/243 |
| 7,165,098 B1 | 1/2007 | Boyer et al. | |
| 7,761,892 B2 | 7/2010 | Ellis et al. | |
| 8,046,801 B2 | 10/2011 | Ellis et al. | |
| 9,299,350 B1 | 3/2016 | Dumont et al. | |
| 9,679,583 B2 * | 6/2017 | Bilobrov | G10L 25/18 |
| 10,127,911 B2 | 11/2018 | Kim et al. | |
| 11,170,089 B2 | 11/2021 | Goldstein et al. | |
| 11,798,565 B2 | 10/2023 | Matthews et al. | |
| 2002/0174430 A1 | 11/2002 | Ellis et al. | |
| 2005/0172319 A1 | 8/2005 | Reichardt et al. | |
| 2005/0251827 A1 | 11/2005 | Ellis et al. | |
| 2006/0106734 A1 | 5/2006 | Hoffman et al. | |
| 2008/0092156 A1 | 4/2008 | Ferrone | |
| 2010/0153885 A1 | 6/2010 | Yates | |
| 2010/0169091 A1 | 7/2010 | Zurek et al. | |
| 2013/0226582 A1 | 8/2013 | Aley-Raz et al. | |
| 2014/0052451 A1 | 2/2014 | Cheong et al. | |
| 2014/0277640 A1 * | 9/2014 | Bilobrov | G10L 25/54 700/94 |
| 2015/0067822 A1 * | 3/2015 | Randall | G06F 21/32 726/17 |
| 2016/0094874 A1 | 3/2016 | Venkataraman et al. | |
| 2016/0259789 A1 | 9/2016 | Shrinath et al. | |
| 2018/0047394 A1 | 2/2018 | Tian et al. | |
| 2018/0158463 A1 | 6/2018 | Ge et al. | |
| 2018/0184240 A1 | 6/2018 | Yang et al. | |
| 2018/0190296 A1 * | 7/2018 | Williams | G10L 17/04 |
| 2018/0204133 A1 | 7/2018 | Cai et al. | |
| 2018/0233152 A1 | 8/2018 | Olaya et al. | |
| 2018/0367835 A1 | 12/2018 | Hamidi-Rad et al. | |
| 2019/0066665 A1 * | 2/2019 | Ye | G10L 15/20 |
| 2019/0080698 A1 | 3/2019 | Miller | |
| 2020/0120384 A1 | 4/2020 | Armaly | |
| 2020/0236429 A1 | 7/2020 | Soundararajan et al. | |
| 2021/0233542 A1 | 7/2021 | Matthews et al. | |

FOREIGN PATENT DOCUMENTS

| | | |
|---|---|---|
| EP | 3257043 B1 | 12/2018 |
| JP | 2000250593 A | 9/2000 |
| JP | 2019514237 A | 5/2019 |
| KR | 20040105999 A | 12/2004 |
| KR | 20110100008 A | 9/2011 |
| KR | 20140079328 A | 6/2014 |
| WO | 2014199602 A1 | 12/2014 |
| WO | 2017147081 A1 | 8/2017 |

* cited by examiner

600

602
Generate a voice signature from a voice command received from a user

604
Identify, based on the voice signature, a plurality of voice characteristics associated with the user, where each of the plurality of voice characteristics corresponds demographic data associated with the user

606
Compare the plurality of demographics with demographic information within each profile of a plurality of profiles associated with a plurality of users associated with a household

608
Determine, based on the comparing, that two or more profiles in the plurality of profiles match the plurality of demographics

610
In response to determining that two or more profiles in the plurality of profiles match the plurality of demographics, identify, based on content of the voice command from the two or more profiles, a profile of the user

612
Generate for display an indication indicating that the user has been identified

FIG. 6

SYSTEMS AND METHODS FOR IDENTIFYING USERS BASED ON VOICE DATA AND MEDIA CONSUMPTION DATA

CROSS-REFERENCE TO RELATED APPLICATIONS

This application is a continuation of U.S. patent application Ser. No. 17/154,571, filed Jan. 21, 2021, which is a continuation of U.S. patent application Ser. No. 16/308,620, filed Dec. 10, 2018 (now U.S. Pat. No. 10,937,431), which is a national stage application under 35 U.S.C. § 371 of International Application No. PCT/US17/68581, filed Dec. 27, 2017 the disclosures of each application are incorporated by reference in their entireties.

BACKGROUND

The number of media consumption devices in each household has increased dramatically over the last few years. As more users consume media from various devices in a household, it may be useful to identify the content that each user is consuming irrespective from the device that the user is using to consume the content. One way that current systems solve this problem is by enabling voice recognition when a user speaks a voice command requesting content. Upon receiving the voice command, current systems compare the user's voice print as extracted from the voice command with previously stored voice prints to obtain a match. However, this process fails when no voice prints have been stored that can be used for comparing voice prints.

SUMMARY

Therefore, systems and methods are disclosed herein for identifying users based on voice data and media consumption data. A media guidance application may be used to perform actions described in relation to identifying users based on voice data and media consumption data. The media guidance application may generate a voice signature from the user's input and, based on that signature, identify some demographic characteristics of the user (e.g., age, gender, and other suitable characteristics). The media guidance application may retrieve user data for users that are associated with a household of the user and attempt to identify which of the users spoke the command. If multiple users are identified, based on the demographic characteristics, the media guidance application may use the content of the command (e.g., a type of media requested) to identify the user.

For example, a household may include a husband, a wife, and two children that are both boys, one nine years old and another fifteen years old. One of the boys may speak a command for the movie "Avatar," which is a PG-13 movie. In response, the media guidance application may analyze the child's voice and determine that the child is a male, between the ages of six and sixteen. The media guidance application may obtain user information for the household and determine, based on that information, that either the first child or the second child spoke the command (e.g., because both parents are presumably older than sixteen years old). The media guidance application may, in order to determine which child spoke the command, identify "Avatar" as the media asset requested. The media guidance application may compare the characteristics of the movie "Avatar" with preferred media characteristics of each child (e.g., obtained from their respective profile), and, based on that information, determine that the older child is the one that spoke the command.

In some aspects, the media guidance application may perform the following actions in order to identify a user based on voice data and media consumption data. The media guidance application may generate a voice signature from a voice command received from a user. For example, the media guidance application may receive a spoken command "Play Avatar." Upon receipt of the command, the media guidance application may generate a voice signature for the user (e.g., portions of the voice input that enable demographic information detection).

The media guidance application may analyze the voice signature to identify demographic characteristics of the speaker. Specifically, the media guidance application may determine, from the voice signature, a plurality of voice characteristics associated with the user, where the plurality of voice characteristics corresponds to a plurality of demographics. For example, the media guidance application may determine from the voice signature that the speaker is between the ages of six and fourteen and that the speaker is a male.

The media guidance application may attempt to obtain user information for users in the household (e.g., the household of the device that received user spoken input). Specifically, the media guidance application may transmit a request for user information associated with a household of the user. For example, the media guidance application may transmit a request that includes the household identifier for the user information.

In response to the request for user information, the media guidance application may receive the household information as requested. Specifically, the media guidance application may receive the user information, where the user information includes respective demographic information of each user within the household. For example, the media guidance application may receive information that indicates that the household includes four users. That is, the possible users may include a male of forty-six years of age, a female of forty-four years of age, and an additional two males of eight and fourteen years of age respectively The media guidance application may compare demographic information extracted from the voice signature with the received demographic household information. Specifically, the media guidance application may compare the plurality of demographics with demographic information within the user information. For example, the media guidance application may compare the gender for the voice signature (e.g., male) with the genders of possible users and determine that the female is not a match. The media guidance application may compare the ages of the users with the age range as extracted from the voice signature.

As a result of the comparison, the media guidance application may identify multiple users that may be a match for the voice signature. Specifically, the media guidance application may determine, based on the comparing, that demographic information associated with two or more users matches the plurality of demographics. For example, the media guidance application may determine that the two boys are the only members of the household that meet the criteria.

In response to matching multiple identities, the media guidance application may use the content of the command to identify which user is the speaker. Specifically, the media guidance application may, in response to determining that the demographic information associated with two or more users matches the plurality of demographics, perform the following actions. The media guidance application may determine that the voice command includes a request for a media asset (e.g., the movie "Avatar"), and compare metadata associated with the media asset with metadata associated with media assets that are of interest to each of the two or more users that match the plurality of demographics. For example, the media guidance application may retrieve a profile of each of the boys and compare the data in each of the profiles with metadata associated with the movie "Avatar."

The media guidance application may, based on the comparison, identify the most likely speaker. Specifically, the media guidance application may determine, based on comparing the metadata associated with the media asset with the metadata associated with media assets that are of interest to each of the two or more users that match the plurality of demographics, that a first user of the two or more users constitutes a best match. For example, the media guidance application may determine that the data in the older boy's (the fourteen-year old's) profile is a better match for metadata of the movie "Avatar" than the younger boy's profile.

The media guidance application may generate for display some type of indicator to inform the viewer that the speaker has been identified. Specifically, the media guidance application may, in response to determining that the first user is the best match, generate for display an indication the user has been identified. For example, the media guidance application may generate for display an icon of the user's photo, an icon of the user's avatar, a name of the user, or another suitable indicator.

In some embodiments, the media guidance application may transmit the request for user information that is associated with the household of the user by taking the following actions. The media guidance application may retrieve an identification string for the user device that received the voice command. Specifically, the media guidance application may determine an identification string associated with a user equipment device where the voice command is received. For example, the media guidance application may retrieve an alphanumeric string that represents a device's serial number.

The media guidance application may use the identification string to build a query for the household information. Specifically, the media guidance application may generate a query for the household user information, where the query includes the identification string. For example, the media guidance application may generate a database search query using the alphanumeric string representing a device's serial number.

The media guidance application may transmit the generated query to a server that stores the appropriate information. Specifically, the media guidance application may transmit the query to a remote server that stores the user information that is associated with the household of the user. For example, the user information that is associated with the household of the user may be stored on a database server at a remote location. The media guidance application may transmit the query over the Internet.

In some embodiments, the media guidance application may, when receiving the user information, store the user information in a data structure. The data structure may include a plurality of entries, where the plurality of entries includes an entry for each user within the household. For example, the media guidance application may store the data structure as a table where the table includes a row for each entry. The media guidance application may store a plurality of fields for each entry, where the plurality of fields includes a field for each item of demographic information associated with a respective user. For example, the table may include an entry including fields for age (e.g., fourteen) and gender (e.g., male).

In some embodiments, the media guidance application may, when comparing the plurality of demographics with the demographic information within the user information, perform the following actions. The media guidance application may retrieve a first entry from the plurality of entries. For example, the media guidance application may retrieve the above exemplified entry, where the age field has a value of fourteen and the gender field has a value of male.

The media guidance application may compare the received demographic information with the demographic extracted from the voice command. Specifically, the media guidance application may compare each demographic of the plurality of demographics with content of a field associated with a corresponding demographic of a first user of the two or more users. For example, the media guidance application may compare the age range extracted from the voice command (e.g., six to sixteen) with the age field of the received entry (e.g., fourteen). The media guidance application may also compare the age range extracted from the voice command with the age field of other entries (i.e., ages of other users in the household).

The media guidance application may identify a matching user based on the demographic comparison. Specifically, the media guidance application may generate, based on comparing each demographic of the plurality of demographics with content of the field associated with the corresponding demographic of the first user of the two or more users, a set of demographic information from the plurality of demographics that matches demographics associated with the first user. For example, the media guidance application may generate a set that includes a first user (e.g., the fourteen-year old male) and a second user (e.g., the eight-year old male).

In some embodiments, the media guidance application may, when determining that demographic information associated with the two or more users matches the plurality of demographics, perform the following actions. The media guidance application may compare an amount of demographic information associated with the first user that matches the plurality of demographics with amounts of demographic information associated with other users that matches the plurality of demographics. For example, the media guidance application may compare for each table entry a number of fields that matches the demographic information from the voice command with a number of fields matching in the other table entries.

The media guidance application may identify multiple sets of matching demographic information. Specifically, the media guidance application may identify, based on comparing the amount of demographic information associated with the first user that matches the plurality of demographics with amounts of demographic information associated with other users that matches the plurality of demographics, two or more users with the highest amount of demographic information that matches. For example, the media guidance application may determine that the two entries for the boys constitute the highest amount of matching information.

In some embodiments, the media guidance application may, when comparing metadata associated with the media asset with metadata associated with media assets that are of interest to each of the two or more users that match the plurality of demographics, perform the following actions.

The media guidance application may receive a plurality of user profiles, where each user profile in the plurality of user profiles corresponds to a user of the two or more users, and where each user profile includes a plurality of characteristics corresponding to media assets that a respective user of the two or more users prefers. For example, the media guidance application may retrieve a user profile for each identified user. The user profile may include information indicating the type of content that the user prefers.

The media guidance application may determine, based on the users' profiles, which of the users that was previously identified, based on the demographic information, matches the voice command. Specifically, the media guidance application may compare the metadata associated with the media asset with the characteristics of media assets that the corresponding user prefers. For example, the media guidance application may compare the metadata of the movie "Avatar" with preferences of the users stored in the corresponding user's profile.

The media guidance application may identify, based on the comparison, for each user's profile, an amount of characteristics that match the metadata of the media asset. Specifically, the media guidance application may determine, for each user of the two or more users based on comparing the metadata associated with the media asset with the characteristics of media assets, that the corresponding user prefers, an amount of characteristics that match. For example, the profile of the fourteen-year old may match the parental guidance rating level (e.g., PG-13) and the genre (e.g., action-adventure), while the profile of the seven-year old may match only the genre.

In some embodiments, the media guidance application may, when determining from the two or more users, one with the highest amount of matching metadata, perform the following actions. The media guidance application may retrieve a weight associated with each characteristic of the plurality of characteristics. For example, the genre characteristic may have a higher weight than the parental guidance rating (e.g., PG-13) characteristic.

The media guidance application may apply a corresponding weight to each characteristic to determine the best match. Specifically, the media guidance application may calculate, using a respective weight for each characteristic, for each user of the two or more users, the amount of characteristics that match. For example, the weight for genre may be 0.75 while the weight for a parental guidance rating may be 0.25. The media guidance application may determine the final amount of characteristics that match by applying these weights to the characteristics.

The media guidance application may select a matching user with the highest amount of characteristics that match. For example, if the fourteen-year old has a final matching score of 1.00 (e.g., parental guidance rating of 0.25 plus genre of 0.75) and the seven-year old has a matching score of 0.75 (e.g., genre of 0.75), the media guidance application may select the fourteen-year old as the speaker of the voice command. In some embodiments, the media guidance application may use context of the command in addition to or instead of command content matching. For example, the media guidance application may use the time of the day associated with the command. If the command is spoken during a time when one of the children in day care, but a second child is already out of school (e.g., at 4 PM), the media guidance application may identify the second child as the speaker. The media guidance application may use other context data for identification. The media guidance application may use seasons, months, days of the week, and other suitable context.

In some embodiments, the media guidance application may, when generating for display the indication that the user has been identified, take the following actions. The media guidance application may retrieve, from storage, a profile of the user. For example, the media guidance application may retrieve user settings from the set-top box or a remote server.

The media guidance application may determine, based on the profile of the user, that the user has selected an avatar. For example, the user's profile may include an identification of an avatar that the user prefers. The media guidance application may generate for display the avatar overlayed over a portion of the media asset. For example, the user's avatar may be a picture of a character of the movie "Avatar" that may be displayed on the screen.

In some embodiments, the media guidance application may store the voice signature on all devices associated with the user. For example, the user may have an electronic tablet in addition to multiple set-top boxes (e.g., in multiple rooms of a home). The media guidance application may transmit the voice signature to all of the devices for later use.

In some embodiments, the media guidance application may update the user's profile with the voice signature. Specifically, the media guidance application may store, in a voice profile of the user, the voice signature and the indication of the media asset and upon detecting a subsequent voice command, determine that a subsequent voice signature associated with the subsequent voice command matches the voice signature. The media guidance application may store content of the subsequent voice command in the voice profile of the user. For example, the media guidance application may store the voice signature identified as belonging to the fourteen-year old boy, and when the fourteen-year boy inputs another voice command (e.g., play terminator), the media guidance application may add an indication of that media content to the user's profile.

In some embodiments, the media guidance application may be identifying a user that is not a member of the household. For example, a visiting relative or friend of the users in the household may be speaking a command to be executed by the media guidance application. The media guidance application may, in order to identify the user that is not a member of the household, determine whether all the users in the household been previously identified. For example, the media guidance application may determine that a new user is a visitor, if the household has four users (two parents and two kids) and four users have already been identified prior. However, if all users of a household have not been identified, the media guidance application may use a frequency of use in the determination. For example, if a user that is speaking a command has not been a frequent user of the system (e.g., first-time speaker or a second-time speaker), the media guidance application may determine that the user is not a member of a household (e.g., a visitor). In contrast, if the user has used the system often, (e.g., twenty times or more), the media guidance application may determine that the user is a member of the house hold.

If the user is not a member of the household, the media guidance application may setup a guest profile for the user. In some embodiments, the media guidance application may ask the user to input the user's credentials for identification or ask the user to input demographic information. In yet some embodiments, the media guidance application may try to use other ways to identify the visitor. For example, the media guidance application may analyze the visitor's voice for demographic data and try to use profiles associated with the members of the household (e.g., social media profiles) to identify the visitor. For example, if the visitor may be a grandfather who may be connected to the members of the household on social media. The media guidance application may use that information to identify the person.

In some embodiments, the media guidance application may use a voice command together with demographic information in order to generate a complete profile for the user. For example, the media guidance application may receive a command from a user and identify the user based on that voice command. Specifically, the media guidance application may compare a voice sample associated with the user that is stored within the media guidance application with the voice command to identify the user. The media guidance application may retrieve demographic information associated with users of the household from a remote location and compare the demographic information extracted from the voice command with the received demographic information. The media guidance application may, based on the comparison, identify the user. The media guidance application may copy demographic information received from the remote server to a user's profile in order to make the user's profile as complete as possible.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 6 is a flowchart of illustrative actions for identifying users based on voice data and media consumption data in accordance with some embodiments of the disclosure;

DETAILED DESCRIPTION

Systems and methods are disclosed herein for identifying users based on voice data and media consumption data. In some embodiments, a media guidance application may generate a voice signature from the user's input and, based on that signature, identify some demographic characteristics of the user (e.g., age, gender, and other suitable characteristics). The media guidance application may retrieve user data for users that are associated with a household of the user and attempt to identify which of the users spoke the command. If multiple users are identified, based on the demographic characteristics, the media guidance application may use the content of the voice command (e.g., a type of media requested) to identify the user.

In some embodiments, the media guidance application may perform the following actions in order to identify a user based on voice data and media consumption data. The media guidance application may generate a voice signature from a voice command received from a user. For example, the media guidance application may receive a spoken command from a user. Upon receipt of the command, the media guidance application may generate a voice signature for the user (e.g., portions of the voice input that enable demographic information detection).

Figure 1:
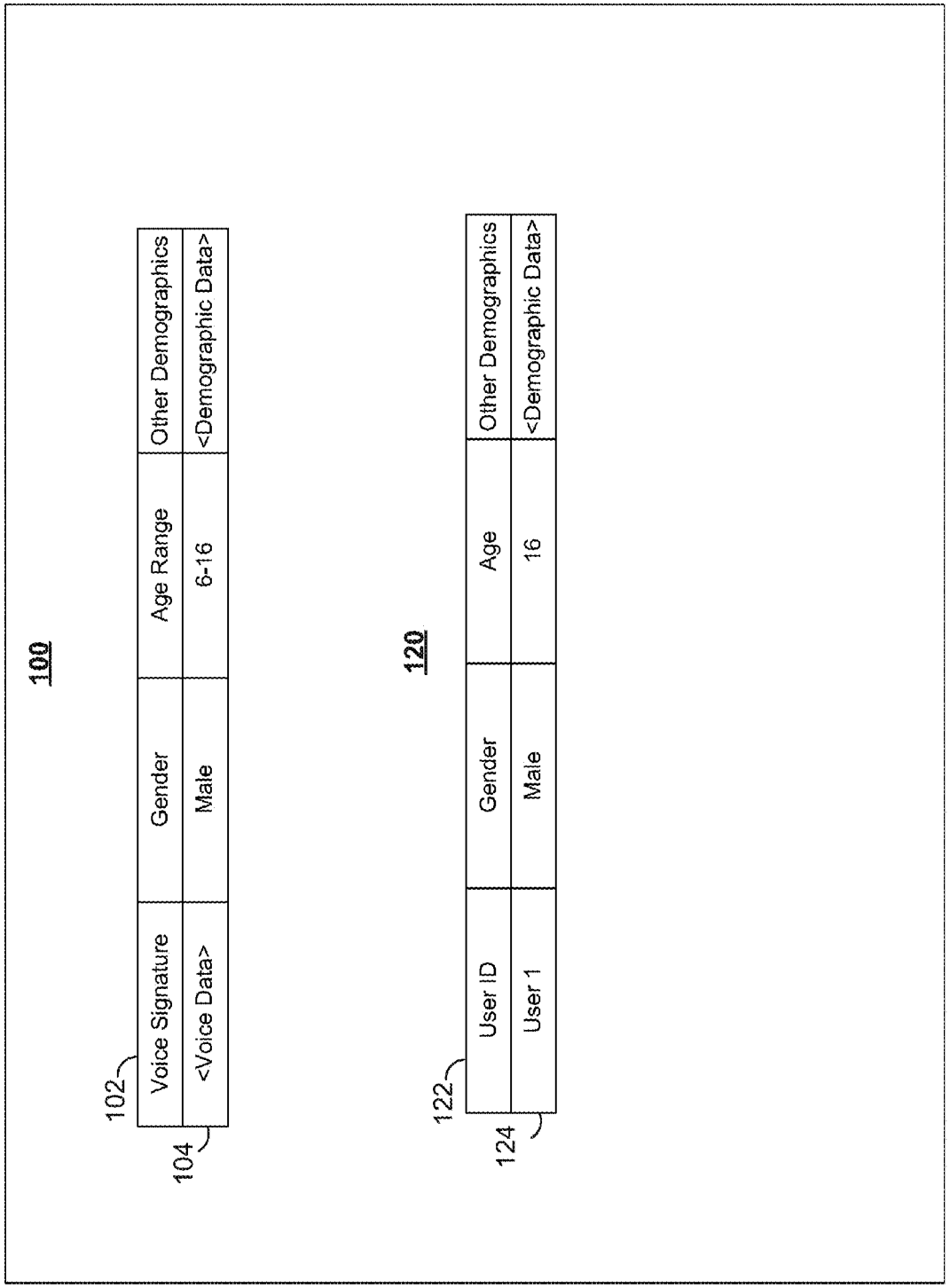
FIG. 1 shows an illustrative example of data structures that include demographic information extracted from a voice signature and demographic data for the users in a household in accordance with some embodiments of the disclosure.

The media guidance application may analyze the voice signature to identify demographic characteristics of the speaker. Specifically, the media guidance application may determine, from the voice signature, a plurality of voice characteristics associated with the user, where the plurality of voice characteristics corresponds to a plurality of demographics. For example, the media guidance application may analyze the voice signature for specific characteristics that are associated with a specific gender and an age range. The media guidance application may store that information in a data structure (e.g., in data structure 100). Data structure 100 of FIG. 1 may include multiple field types 102. Field types 102 may include a voice signature field that may include binary or hexadecimal data representing the voice signature. It should be noted that the voice signature may be stored as another suitable type of data. Fields 102 may also include the gender field, age range field and other suitable demographic fields. In some embodiments, data structure 100 may include context fields associated with the voice command. For example, the date/time of the command, the location where the command was spoken as well other suitable context data. Data structure 100 may include multiple entries 104. Each entry 104 may include demographic data extracted from the voice signature (e.g., gender value, age range value, and other suitable demographic data values). It should be noted that data structures 100 and 120 may include separate fields for other demographic data, where one demographic data type corresponds to one field.

The media guidance application may attempt to obtain user information for users in the household (e.g., the household of the device that received user spoken input). Specifically, the media guidance application may transmit a request for user information associated with a household of the user. For example, the media guidance application may transmit a request that includes the household identifier for the user information.

In response to the request for user information, the media guidance application may receive the household information. Specifically, the media guidance application may receive the user information, where the user information includes respective demographic information of each user within the household. For example, the media guidance application may receive a data structure that includes a number of entries, each entry for a household member. Data structure 120 of FIG. 1 may serve as an illustrative example of such a data structure. Field types 122 may include a User ID field (e.g., an alphanumeric string, number, or hexadecimal number), a gender field, and an age field. It should be noted that the age field in this data structure is a specific number. In some embodiments, the age field may include a date of birth of the user instead of age. Other demographic data may be stored in the data structure as well. Data structure 120 may include entries 124 that have field values for each field type. For example, User 1 may be a User ID value, male may be a gender and sixteen may be an age of the specific user. Multiple entries 124 may be stored in the data structure.

The media guidance application may compare demographic information extracted from the voice signature with the received demographic household information. Specifically, the media guidance application may compare the plurality of demographics with demographic information within the user information. For example, the media guidance application may compare gender value in entry 104 with gender value in entry 124. The same comparison may be made for the Age field and other demographic fields.

As a result of the comparison, the media guidance application may identify multiple users that may be a match for the voice signature. Specifically, the media guidance application may determine, based on the comparing, that demographic information associated with two or more users matches the plurality of demographics. For example, the media guidance application may determine that two entries 124 match entry 104.

In response to matching multiple identities, the media guidance application may use the content of the command to identify which user is the speaker. Specifically, the media guidance application may, in response to determining that the demographic information associated with two or more users matches the plurality of demographics, perform the following actions. The media guidance application may determine that the voice command includes a request for a media asset (e.g., by executing a speech recognition algorithm on the voice command), and compare metadata associated with the media asset with metadata associated with media assets that are of interest to each of the two or more users that match the plurality of demographics. For example, the media guidance application may retrieve a profile for each matching user. The profile may be stored in memory of the device where the voice command was received and/or at a remote server. Each profile may include data indicating the user's preferences (e.g., a preferred genre, a preferred parental guidance rating, a favorite actor, favorite movie, or another suitable preference).

The media guidance application may, based on the comparison, identify the most likely speaker. Specifically, the media guidance application may determine, based on comparing the metadata associated with the media asset with the metadata associated with media assets that are of interest to each of the two or more users that match the plurality of demographics, that a first user of the two or more users constitutes a best match. For example, the media guidance application may determine that the data in a first profile is a better match for metadata of the media asset than the data in the second profile, because, for example, the first profile denotes a preference for action-adventure genre while the second profile denotes a preference for children's comedy.

The media guidance application may generate for display some type of indicator to inform the viewer that the speaker has been identified. Specifically, the media guidance application may, in response to determining that the first user is the best match, generate for display an indication the user has been identified. For example, the media guidance application may generate for display an icon of the user's photo, an icon of the user's avatar, a name of the user, or another suitable indicator.

In some embodiments, the media guidance application may transmit the request for user information that is associated with the household of the user by taking the following actions. The media guidance application may retrieve an identification string for the user device that received the voice command. Specifically, the media guidance application may determine an identification string associated with a user equipment device where the voice command is received. For example, the media guidance application may retrieve an alphanumeric string that represents a device's serial number.

The media guidance application may use the identification string to build a query for the household information. Specifically, the media guidance application may generate a query for the household user information, where the query includes the identification string. For example, the media guidance application may generate a database search query using the alphanumeric string representing a device's serial number.

The media guidance application may transmit the generated query to a server that stores the appropriate information. Specifically, the media guidance application may transmit the query to a remote server that stores the user information that is associated with the household of the user. For example, the user information that is associated with the household of the user may be stored on a database server at a remote location. The media guidance application may transmit the query over the Internet.

In some embodiments, the media guidance application may, when receiving the user information, store the user information in a data structure. The data structure may include a plurality of entries, where the plurality of entries includes an entry for each user within the household. For example, the media guidance application may store the data structure as a table where the table includes a row for each entry. The media guidance application may store a plurality of fields for each entry, where the plurality of fields includes a field for each item of demographic information associated with a respective user. For example, the table may include an entry (e.g., entry 124) including fields for age and gender.

In some embodiments, the media guidance application may, when comparing the plurality of demographics with the demographic information within the user information, perform the following actions. The media guidance application may retrieve a first entry from the plurality of entries. For example, the media guidance application may retrieve the first entry from memory an entry 124.

The media guidance application may compare the received demographic information with the demographic extracted from the voice command. Specifically, the media guidance application may compare each demographic of the plurality of demographics with content of a field associated with a corresponding demographic of a first user of the two or more users. For example, the media guidance application may compare the age range extracted from the voice command (e.g., age range field of entry 104) with the age field of the received entry (e.g., age field of entry 124). The media guidance application may also compare the age range extracted from the voice command with the age field of other entries (i.e., ages of other users in the household).

The media guidance application may identify a matching user based on the demographic comparison. Specifically, the media guidance application may generate, based on comparing each demographic of the plurality of demographics with content of the field associated with the corresponding demographic of the first user of the two or more users, a set of demographic information from the plurality of demographics that matches demographics associated with the first user. For example, the media guidance application may generate a set that includes a first user and a second user. The set may include an entry 124 for each user.

In some embodiments, the media guidance application may, when determining that demographic information associated with the two or more users matches the plurality of demographics, perform the following actions. The media guidance application may compare an amount of demographic information associated with the first user that matches the plurality of demographics with amounts of demographic information associated with other users that matches the plurality of demographics. For example, the media guidance application may compare for each entry 124 a number of fields (e.g., gender and age fields) that matches the demographic information from the voice command with a number of fields matching in the other table entries. For example, the media guidance application may determine, based on the comparison, that two entries have two fields matching while two entries have no entries matching.

The media guidance application may identify multiple sets of matching demographic information. Specifically, the media guidance application may identify, based on comparing the amount of demographic information associated with the first user that matches the plurality of demographics with amounts of demographic information associated with other users that matches the plurality of demographics, two or more users with the highest amount of demographic information that matches. For example, the media guidance application may determine that two entries (e.g., entries 124) constitute the highest amount of matching information.

In some embodiments, the media guidance application may, when comparing metadata associated with the media asset with metadata associated with media assets that are of interest to each of the two or more users that match the plurality of demographics, perform the following actions. The media guidance application may receive a plurality of user profiles, where each user profile in the plurality of user profiles corresponds to a user of the two or more users, and where each user profile includes a plurality of characteristics corresponding to media assets that a respective user of the two or more users prefers. For example, the media guidance application may retrieve from memory a user profile for each identified user. The user profile may include information indicating the type of content that the user prefers. For example, each user's profile may include user's favorite media asset, preferred genre, preferred actors, and other suitable preferences.

The media guidance application may determine, based on the users' profiles, which of the users that were previously identified, based on the demographic information, matches the voice command. Specifically, the media guidance application may compare the metadata associated with the media asset with the characteristics of media assets that the corresponding user prefers. For example, the media guidance application may retrieve the metadata associated with the media asset. The metadata may be retrieved from local storage (e.g., program listing database) or from a remote server. The metadata may include a genre of the media asset. The media guidance application may compare the genre of the media asset with a user's preferred genre in the user's profile to determine a match. The process may be repeated for other metadata associated with the media asset (e.g., each actor may be compared with the list of actors preferred by the user). In some embodiments, instead of or in addition to using content of the command to identify one of a subset of users, the media guidance application may prompt a user for identification. For example, the media guidance application may generate for display two or more user identifiers corresponding to the matching users so that the speaker is able to choose one. In some embodiments, the media guidance application may speak the choices to the user. The media guidance application may receive a user selection of the appropriate identifier.

The media guidance application may identify, based on the comparison for each user's profile, an amount of characteristics that match the metadata of the media asset. Specifically, the media guidance application may determine, for each user of the two or more users based on comparing the metadata associated with the media asset with the characteristics of media assets that the corresponding user prefers, an amount of characteristics that match. For example, the one profile may match a genre while another profile may match a genre, parental guidance rating and favorite actor.

In some embodiments, the media guidance application may, when determining from the two or more users, one with the highest amount of matching metadata, perform the following actions. The media guidance application may retrieve a weight associated with each characteristic of the plurality of characteristics. For example, the genre characteristic may have a higher weight than parental guidance rating characteristic.

The media guidance application may apply a corresponding weight to each characteristic to determine the best match. Specifically, the media guidance application may calculate, using a respective weight for each characteristic for each user of the two or more users, the amount of characteristics that match. For example, the weight for genre may be 0.75 while the weight for the parental guidance rating may be 0.25. The media guidance application may determine the final amount of characteristics that match by applying these weights to the characteristics.

The media guidance application may select a matching user with the highest amount of characteristics that match. For example, the media guidance application may identify a user with the highest number of matching characteristics as the speaker of the voice command.

In some embodiments, the media guidance application may, when generating for display the indication that the user has been identified, take the following actions. The media guidance application may retrieve, from storage, a profile of the user. For example, the media guidance application may retrieve user settings from the set-top box or a remote server.

The media guidance application may determine, based on the profile of the user, that the user has selected an avatar. For example, the user's profile may include an identification of an avatar that the user prefers. The media guidance application may generate for display the avatar overlayed over a portion of the media asset.

In some embodiments, the media guidance application may store the voice signature on all devices associated with the user. For example, the user may have an electronic tablet in addition to multiple set-top boxes (e.g., in multiple rooms of a home). The media guidance application may transmit the voice signature to all of the devices for later use.

In some embodiments, the media guidance application may update the user's profile with the voice signature. Specifically, the media guidance application may store in a voice profile of the user the voice signature and the indication of the media asset and upon detecting a subsequent voice command, determine that a subsequent voice signature associated with the subsequent voice command matches the voice signature. The media guidance application may store content of the subsequent voice command in the voice profile of the user. The media guidance application may store the information in memory of the tablet and other devices associated with the user as well as a server that can push the information to newly-acquired device.

In some embodiments, the media guidance application may be identifying a user that is not a member of the household. For example, a visiting relative or friend of the users in the household may be speaking a command to be executed by the media guidance application. The media guidance application may, in order to identify the user that is not a member of the household, determine whether all the users in the household been previously identified. For example, the media guidance application may iterate through each user in the household and retrieve the respective profile of the user. In some embodiments, the media guidance application may merely access the profile of the user. The media guidance application may determine from a flag in the user's profile whether the user has been identified. If all users in the household have a flag in a profile that the user has been identified, the media guidance application may determine that a visiting user is using the system. However, if all users of a household have not been identified, the media guidance application may use a frequency of use in the determination. For example, the media guidance application may compare the user's voice print with other voice prints that used to access the system. For example, the media guidance application may store each voiceprint that was used to access the system and the frequency of access. If a user that is speaking a command has not been a frequent user of the system (two or fewer times), the media guidance application may determine that the user is not a member of a household (e.g., a visitor). In contrast, if the user has used the system often, (e.g., twenty times or more), the media guidance application may determine that the user is a member of the house hold. The media guidance application may also use timing together with frequency of access. For example, the media guidance application may determine the frequency of access for a specific month or in the past thirty days. In some embodiments, the media guidance application may determine whether the user is a guest or not based on a user's device. If the user's device is one that is not often connected to the household network, the user may be a guest.

In some embodiments, the control circuitry may determine whether the user is a guest or a member of the household based on frequency of the voice input of the user. For example, if a specific user uses a voice input device often within the household (e.g., ten times per month), the control circuitry may determine that the user is a member of the household. However, if frequency of input is small (e.g., one or two times in the last month), the media guidance application may determine that the user is a guest in the household.

If the user is not a member of the household, the media guidance application may setup a guest profile for the user. In some embodiments, the media guidance application may generate for display a prompt for the user to input the user's credentials for identification or a prompt to input demographic information. In yet some embodiments, the media guidance application may try to use other ways to identify the visitor. For example, the media guidance application may analyze the user's voice for demographic data (as discussed above) and try to use profiles associated with the members of the household (e.g., social media profiles) to identify the visitor. For example, the media guidance application may iterate through a profile of each user in the household to identify social media accounts associated with each user. The media guidance application may iterate through each social media account to identify the visitor by comparing, for example, age and gender of each user's social media connections with the voice command demographic data.

In some embodiments, the media guidance application may use a voice command together with demographic information in order to generate a complete profile for the user. For example, the media guidance application may receive a command from a user and identify the user based on that voice command. Specifically, the media guidance application may compare a voice sample associated with the user that is stored within the media guidance application with the voice command to identify the user. The media guidance application may retrieve demographic information associated with users of the household from a remote location and compare the demographic information extracted from the voice command with the received demographic information. For example, the media guidance application may retrieve demographic data and store it in data structure 120. The media guidance application may, based on the comparison, identify the user. For example, User 1 of data structure 120 may correspond to a male of ages 6-16 of data structure 100. The media guidance application may copy demographic information received from the remote server to a user's profile in order to make the user's profile as complete as possible.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 2:
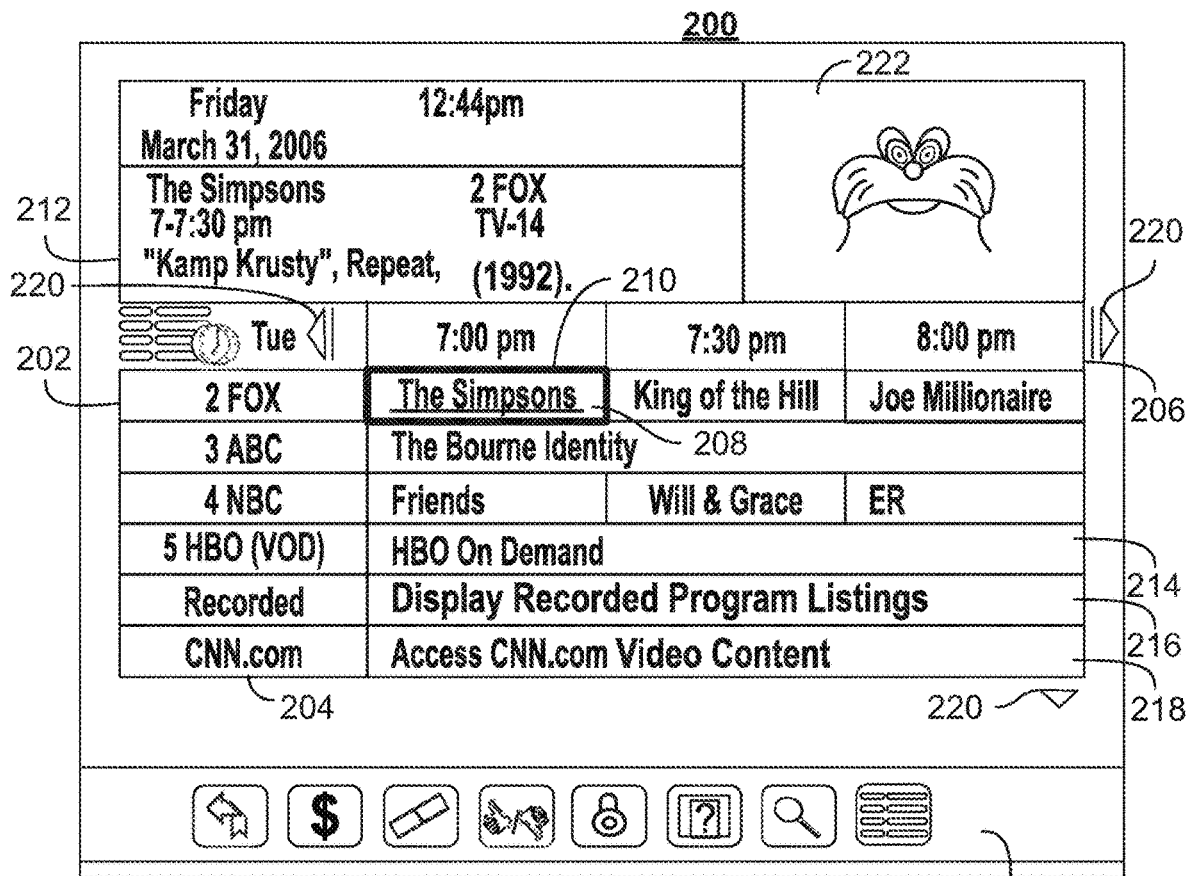
FIG. 2 shows an illustrative example of a display screen for use in accessing media content in accordance with some embodiments of the disclosure.
Figure 3:
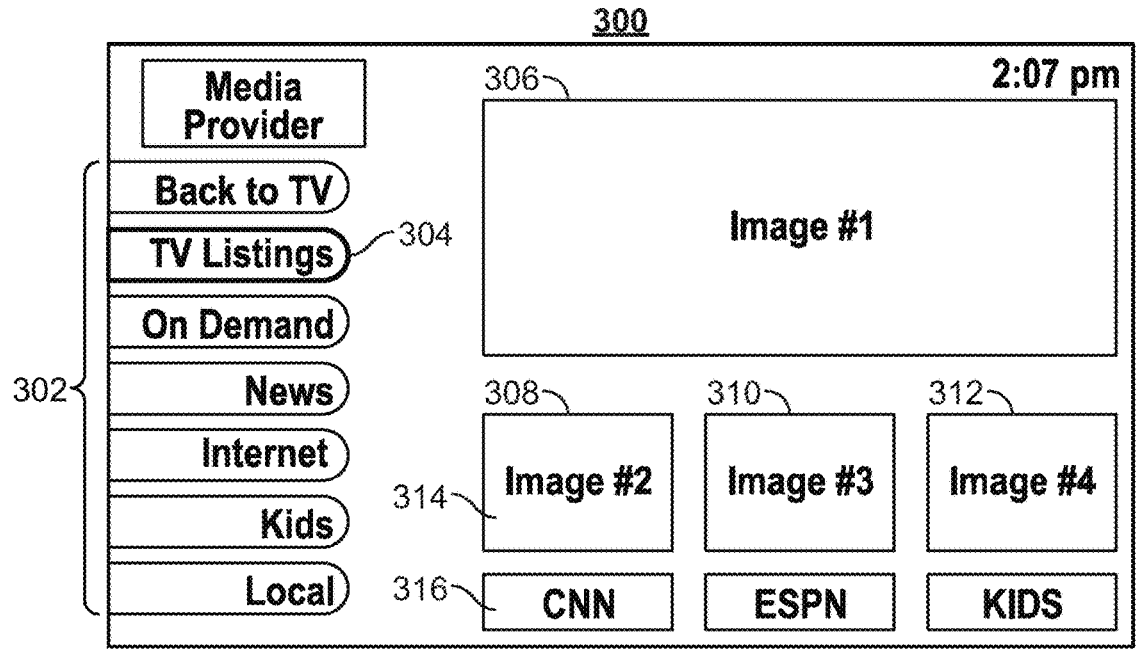
FIG. 3 shows another illustrative example of a display screen for use in accessing media content in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/

0153885, filed Nov. 12, 2009, which is hereby incorporated by reference herein in its entirety.

Figure 4:
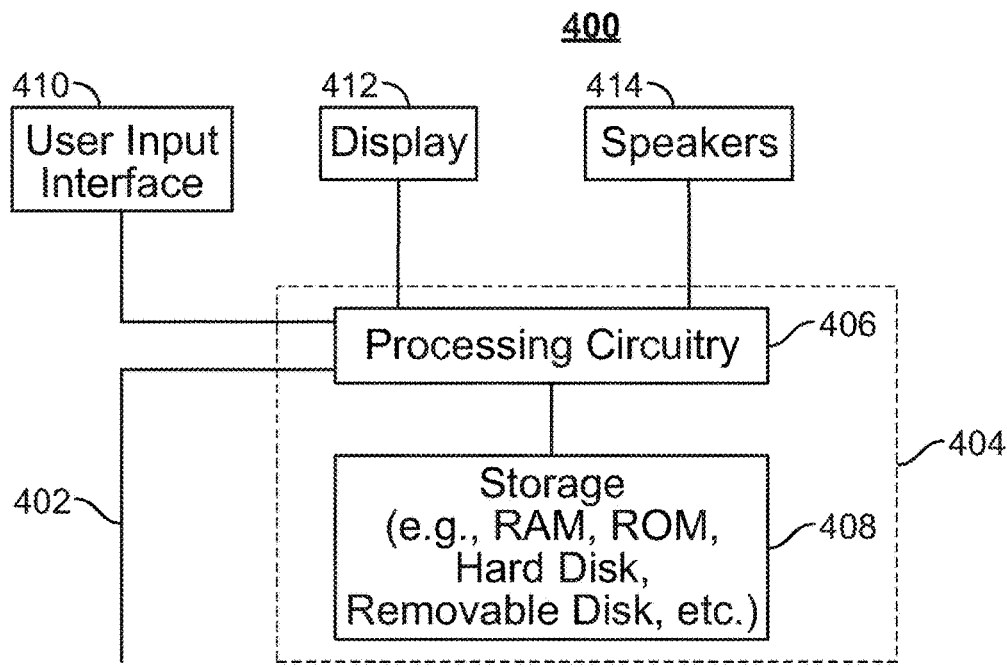
FIG. 4 is a block diagram of an illustrative user equipment device in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
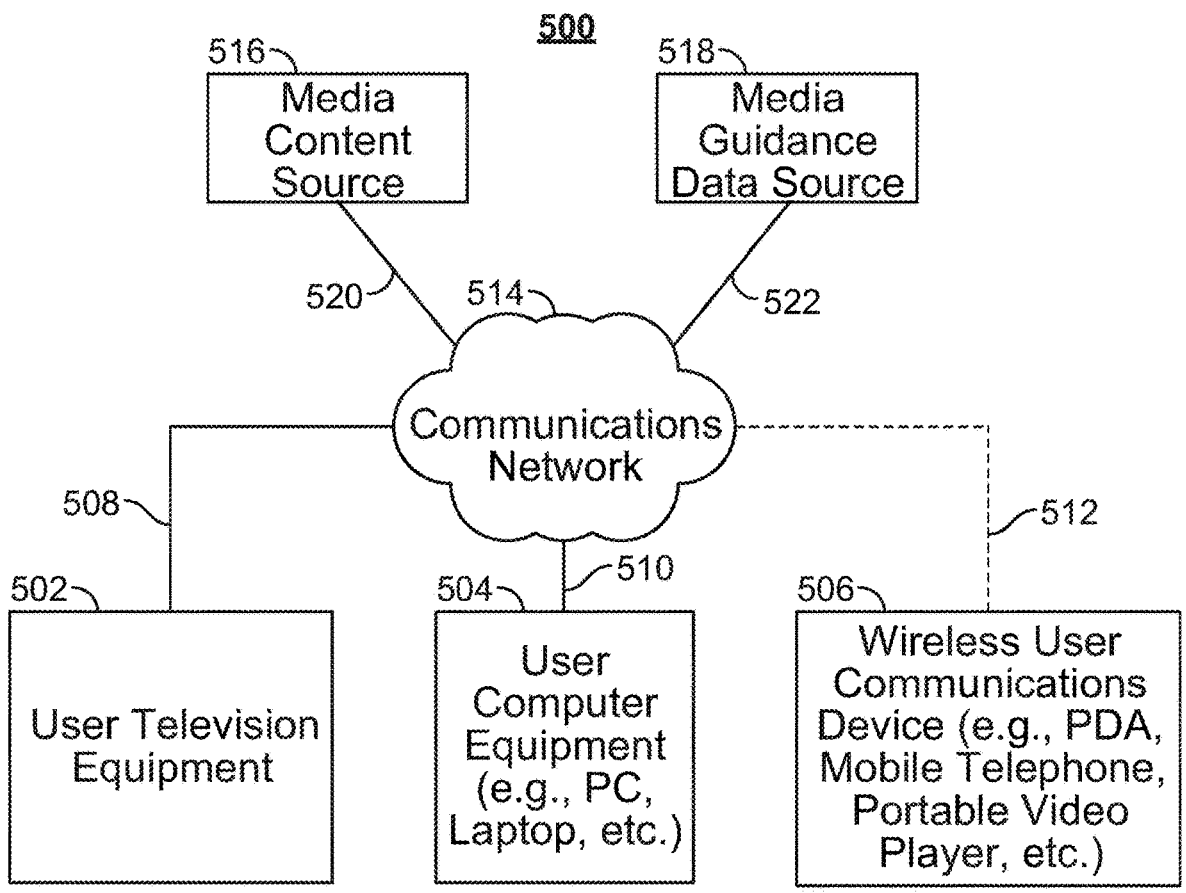
FIG. 5 is a block diagram of an illustrative media system in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a standalone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

FIG. 6 is a flowchart of illustrative actions for identifying users based on voice data and media consumption data in accordance with some embodiments of the disclosure. At 602, control circuitry 404 generates a voice signature from a voice command received from a user. For example, control circuitry 404 may receive voice input from a user via user input interface 410 and analyze the user input to generate the voice signature and store the voice signature in storage 408. In some embodiments, the control circuitry may store the voice signature at a remote server (e.g., a server associated with media content source 516 and/or media guidance data source 518).

At 604, control circuitry 404 identifies, based on the voice signature, a plurality of voice characteristics associated with the user, where each of the plurality of voice characteristics corresponds demographic data associated with the user. For example, control circuitry 404 may retrieve the stored voice signature from storage 408 and execute an algorithm on the voice signature to identify the voice characteristics.

At 606, control circuitry 404 compares the plurality of demographics with demographic information within each profile of a plurality of profiles associated with a plurality of users associated with a household. The control circuitry may execute a comparison algorithm on the demographics extracted from the voice signature with the demographic information received from a remote server (e.g., a remote server associated with media content source 516 or media guidance data source 518). For example, the control circuitry may compare demographic data extracted from the voice command (e.g., stored in data structure 100) with demographic data received from a remote source (e.g., demographic data stored in data structure 120).

At 606, control circuitry 404 determines, based on the comparing, that two or more profiles in the plurality of profiles match the plurality of demographics. For example, control circuitry 404 may determine that two or more profiles include demographics that equally match the demographics extracted from the voice signature. For example, control circuitry 404 may determine, based on comparing the external demographic data with demographic data extracted from the voice command (e.g., data in data structure 100 and data in data structure 120), that two profiles equally match the extracted demographic data.

At 608, control circuitry 404 determines, based on the comparing, that two or more profiles in the plurality of profiles match the plurality of demographics. For example, control circuitry 404 may mark those entries of entries 124 that are a match. It should be noted that if only one profile matches, the media guidance application may determine that a user identification has been completed and skip action 610.

At 610, in response to determining that two or more profiles in the plurality of profiles match the plurality of demographics, control circuitry 404 identifies, based on content of the voice command from the two or more profiles, a profile of the user. For example, the control circuitry may identify a user's profile that best matches the metadata of the media asset. At 612, control circuitry 404 generates for display an indication indicating that the user has been identified. For example, the control circuitry may generate for display the indication on display 412.

Figure 7:
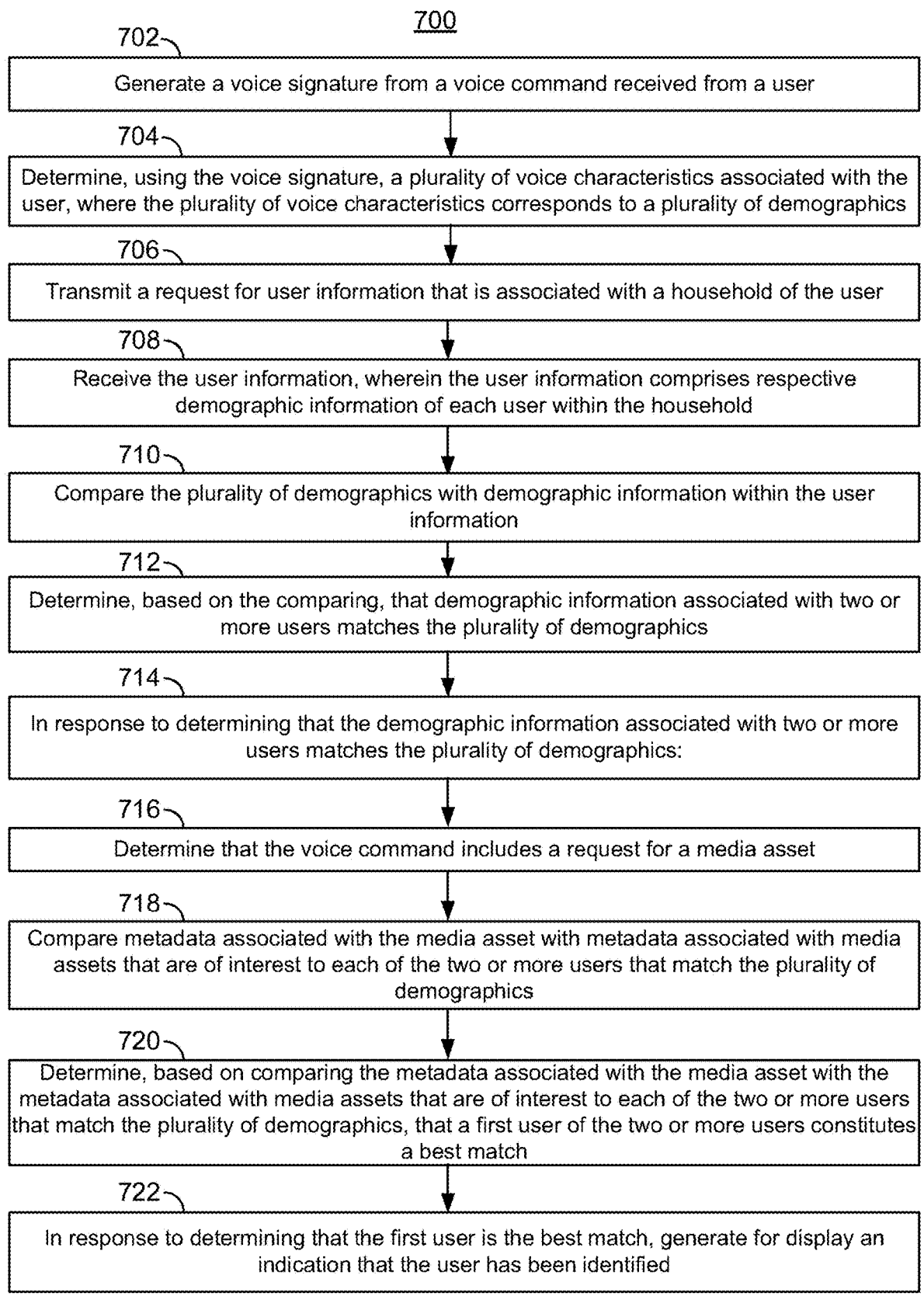
FIG. 7 is another flowchart of illustrative actions for identifying users based on voice data and media consumption data in accordance with some embodiments of the disclosure.

FIG. 7 is another flowchart of illustrative actions for identifying users based on voice data and media consumption data, in accordance with some embodiments of the disclosure. At 702, control circuitry 404 generates a voice signature from a voice command received from a user. For example, control circuitry 404 may receive voice input from a user via user input interface 410 and analyze the user input to generate the voice signature and store the voice signature in storage 408. In some embodiments, the control circuitry may store the voice signature at a remote server (e.g., a server associated with media content source 516 and/or media guidance data source 518).

At 704, control circuitry 404 determines, from the voice signature, a plurality of voice characteristics associated with the user, where the plurality of voice characteristics corresponds to a plurality of demographics. For example, control circuitry 404 may retrieve the stored voice signature from storage 408 and execute an algorithm on the voice signature to identify the voice characteristics.

At 706, control circuitry 404 transmits a request for user information that is associated with a household of the user. For example, the control circuitry may transmit a query (e.g., via I/O interface 402) to a remote server (e.g., media content source 516 or media guidance data source 518).

At 708, control circuitry 404 receives the user information, where the user information comprises respective demographic information of each user within the household. For example, control circuitry may receive a data structure (e.g., data structure 120) and store the data structure in storage 408 (e.g., in Random Access Memory). At 710, control circuitry 404 compares the plurality of demographics with demographic information within the user information. For example, control circuitry 404 may retrieve (e.g., from storage 408) the received demographic information for the comparison.

At 712, control circuitry 404 determines, based on the comparing, that demographic information associated with two or more users matches the plurality of demographics. For example, the control circuitry may store with the matching entries (e.g., in storage 408) an indicator of the match. At 714, control circuitry 404, in response to determining that the demographic information associated with two or more users matches the plurality of demographics, performs the following actions.

At 716, control circuitry 404 determines that the voice command includes a request for a media asset. For example, control circuitry 404 may analyze the voice command and extract an identifier of the media asset requested. At 718, control circuitry 404 compares metadata associated with the media asset with metadata associated with media assets that are of interest to each of the two or more users that match the plurality of demographics. For example, control circuitry 404 may compare string values for the demographic information (e.g., age range and age) and/or Boolean values (e.g., for gender) for other demographic information.

At 720, control circuitry 404 determines, based on comparing the metadata associated with the media asset with the metadata associated with media assets that are of interest to each of the two or more users that match the plurality of demographics, that a first user of the two or more users constitutes a best match. Control circuitry 404, in response to determining that the first user is the best match, generates for display an indication that the user has been identified. For example, the control circuitry may generate for display, on display 412 the indication.

Figure 8:
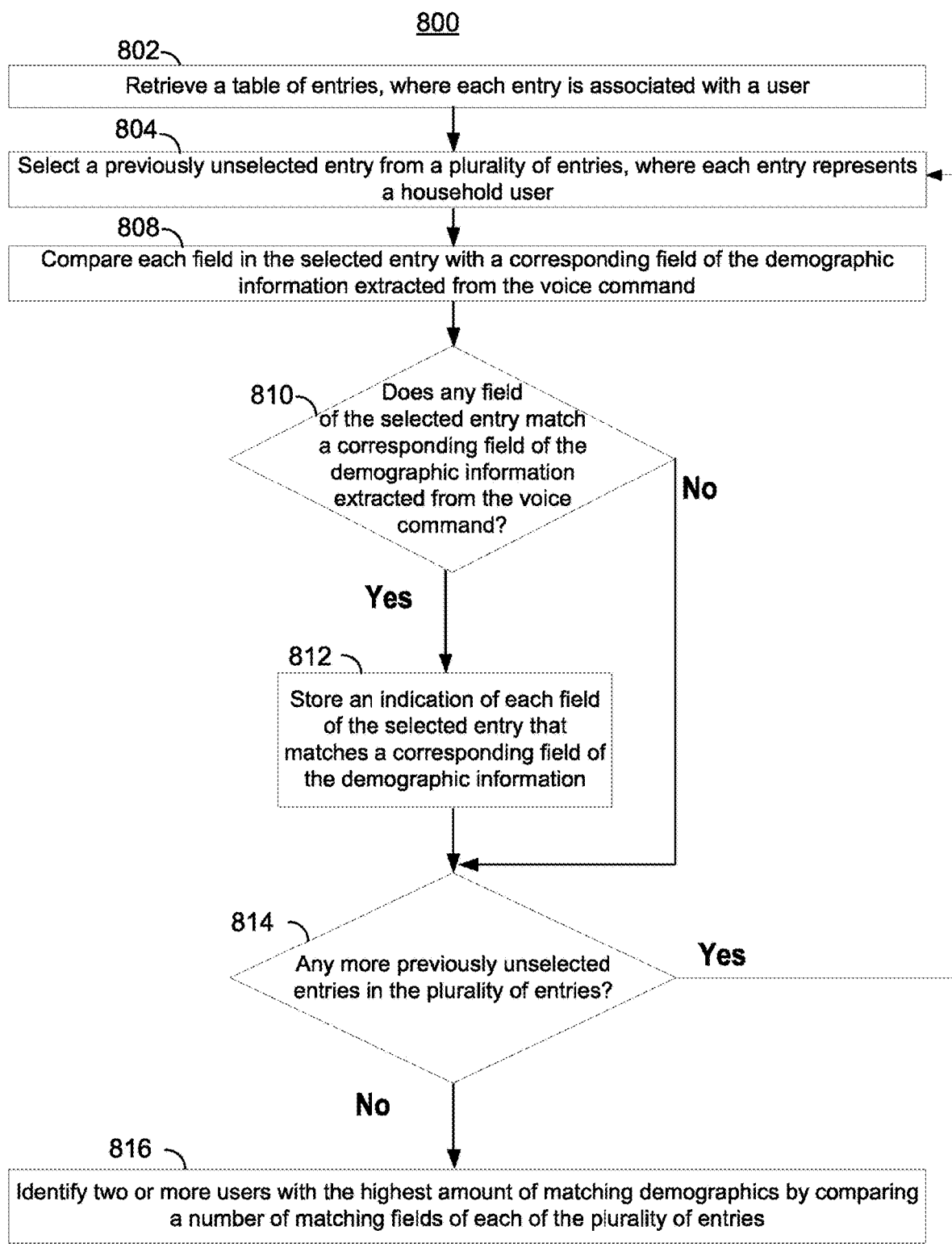
FIG. 8 is a flowchart of illustrative actions for determining that demographic information associated with two or more users matches the plurality of demographics in accordance with some embodiments of the disclosure.

FIG. 8 is a flowchart of illustrative actions for determining that demographic information associated with two or more users matches the plurality of demographics in accordance with some embodiments of the disclosure. At 802, control circuitry 404 retrieves a table of entries, where each entry is associated with a user. For example, the control circuitry may retrieve data structure 120 that includes a plurality of entries 124. At 804, control circuitry 404, selects a previously unselected entry from a plurality of entries, where each entry represents a household user. For example, each entry may be selectable via a data structure. The control circuitry may iterate through each entry.

At 808, control circuitry 404 compares each field in the selected entry with a corresponding field of the demographic information extracted from the voice command. For example, the control circuitry may perform a string comparison or another type of comparison between the corresponding fields. At 810, control circuitry 404 determines whether any field of the selected entry matches a corresponding filed of the demographic information extracted from the voice command. For example, control circuitry 404 may determine that one or more fields match. If no field of the selected entry matches the demographic information, process 800 moves to action 814. If at least one field of the selected entry matches a corresponding field of the demographic information, process 800 moves to 812.

At 812, control circuitry 404 stores an indication of each field of the selected entry that matches a corresponding field of the demographic information. For example, the control circuitry may store within each field an indication of whether the match has occurred. At 814, control circuitry 404 determines whether there are any more previously unselected entries in the plurality of entries. If there are more previously unselected entries in the plurality of entries, process 800 moves to action 804, where another previously unselected entry is selected for processing. If there are no more previously unselected entries in the plurality of entries, process 800 moves to action 816. At 816, control circuitry 404 identifies two or more users with the highest amount of matching demographics by comparing a number of matching fields of each of the plurality of entries.

Figure 9:
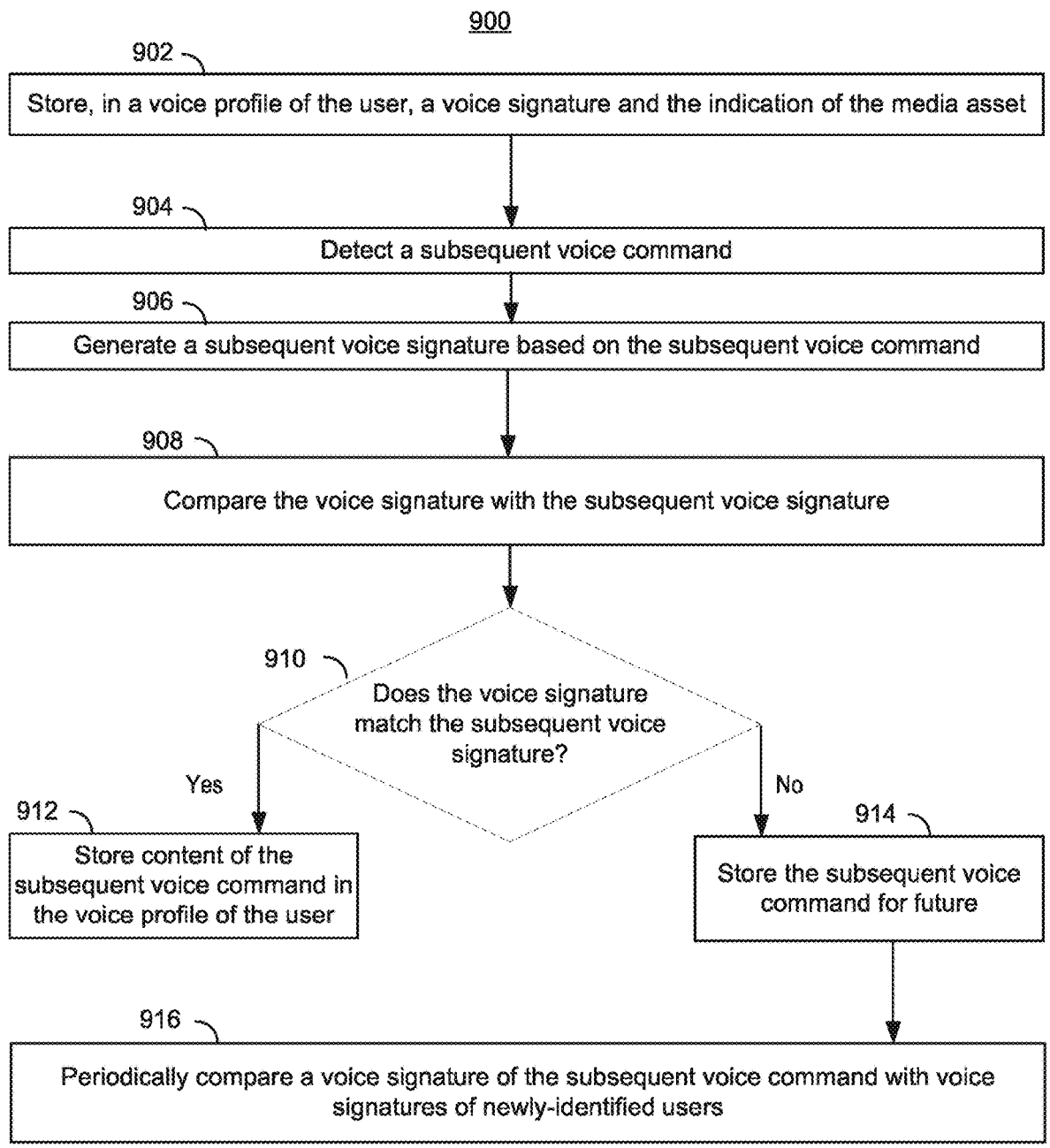
FIG. 9 is a flowchart of illustrative actions for matching a voice signature to user in accordance with some embodiments of the disclosure.

FIG. 9 is a flowchart of illustrative actions for matching a voice signature to user, in accordance with some embodiments of the disclosure. At 902, control circuitry 404 stores, in a voice profile of the user, a voice signature and the indication of the media asset. The control circuitry may store the voice profile in storage 408. At 904, control circuitry 404 detects a subsequent voice command. For example, the control circuitry may detect voice input from user input interface 410.

At 906, control circuitry 404 generates a subsequent voice signature based on the subsequent voice command. For example, control circuitry 404 may generate the subsequent voice signature in the same manner as the original voice signature. At 908, control circuitry 404 compares the voice signature with the subsequent voice signature. For example, the voice signatures may be analyzed for voice specific data and that voice specific data may be compared.

At 910, control circuitry 404 determines whether the voice signature matches the subsequent voice signature. If control circuitry 404 determines that the voice signature matches the subsequent voice signature, process 900 moves to 912, where control circuitry 404 stores content of the subsequent voice command in the voice profile of the user. However, if the control circuitry 404 determines that the voice signature does not match the subsequent voice signature, process 900 moves to 914, where control stores the subsequent voice command. For example, control circuitry 404 may instantiate a data structure for unidentified voice commands. The control circuitry may store that data structure in storage 408.

At 916, control circuitry 404 periodically compares a voice signature of the subsequent voice command with voice signatures of newly-identified users. For example, as new users join the system and are identified, the voice signature from the voice command may be compared, and if a match is found, the user's voice command content may be stored in the user's profile or otherwise processed. It should be noted that a voice profile may be stored in a combination of places. For example, the user's profile, including the demographic data may be stored in storage 408 on a user device (e.g., user television equipment 502, user computer equipment 504, and/or wireless communications device 506). Additionally or alternatively, the user's profile may be stored on a remote server (e.g., a server associated with media content source 516 and/or media guidance data source 518).

The processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for identifying a user based on voice data and media consumption data, the method comprising:
    generating, by a media guidance application executed on a user equipment device, a voice signature from a voice command received via the user equipment device;
    retrieving, by the media guidance application, a table of entries, wherein each entry is associated with a voice signature of a user associated with a respective household user device;
    (a) selecting, by the media guidance application, one or more first entries from a plurality of entries;
    (b) comparing, by the media guidance application, each field in the one or more first entries with a corresponding field associated with demographic information extracted from the voice command;
    (c) determining, by the media guidance application, whether any field of the one or more first entries matches the corresponding field associated with the demographic information extracted from the voice command;
    based on the (a) selecting, (b) comparing, and (c) determining steps:
        in response to determining that none of the fields in the one or more first entries match the corresponding field associated with the demographic information extracted from the voice command;
            determining, by the media guidance application, whether there are one or more second entries of the plurality of entries, wherein the one or more second entries that were not previously selected from the plurality of entries; and
        in response to determining, by the media guidance application, that a field of the one or more first entries matches the corresponding field associated with the demographic information extracted from the voice command:
            storing, by the media guidance application, an indication of each field of the one or more first entries that matches the corresponding field of the demographic information extracted from the voice command; and
            identifying, by the media guidance application, two or more users associated with respective household user devices with a highest amount of matching demographics by comparing a number of matching fields in the one or more first entries.

2. The method of claim 1, further comprising:
    comparing each field in the one or more second entries with the corresponding field associated with the demographic information extracted from the voice command; and
    determining whether any field of the one or more second entries matches the corresponding field associated with the demographic information extracted from the voice command.

3. The method of claim 1, wherein retrieving the table of entries comprises:
    transmitting a request for user voice information that is associated with the user associated with the respective household user device; and
    receiving a data structure containing the table with the plurality of entries.

4. The method of claim 3, wherein transmitting the request for the user voice information that is associated with the user associated with the respective household user device comprises:
    determining an identification string associated with the user equipment device where the voice command is received;
    generating a query for the user voice information that is associated with the user associated with the respective household user device, wherein the query comprises the identification string; and
    transmitting the query to a remote server that stores the user voice information that is associated with the user associated with the respective household user device-voice information.

5. The method of claim 1, wherein the fields of an entry include at least one of: a gender field, age range field or other demographic fields.

6. The method of claim 1, wherein the fields of an entry include binary or hexadecimal data representing the voice signature.

7. The method of claim 1, wherein identifying the two or more users associated with the respective household user devices with the highest amount of matching demographics comprises:
retrieving a weight associated with each field of the one or more first entries, wherein each field is associated with demographic information;
calculating, using a respective weight for each field, for each user associated with the respective household user device, the amount of demographic information of each field that matches the demographic information extracted from the voice command; and
selecting the matching users associated with the respective household user devices with the highest amount of demographic information that matches.

8. The method of claim 1, wherein identifying the two or more users associated with the respective household user devices with the highest amount of matching demographics comprises:
retrieving, from storage, a profile associated with each user of the respective household user devices;
determining, based on the profile associated with each user of the respective household user devices that a respective user has selected an avatar, wherein the avatar is visual representation of the respective user; and
generating for display the avatar overlaid over a portion of a displayed media asset.

9. The method of claim 1, further comprising:
storing in a profile associated with the user of the respective household user device, the voice signature of the user and an indication of a media asset referred to in the voice command;
detecting a subsequent voice command;
determining that a subsequent voice signature of the user associated with the subsequent voice command matches the voice signature of the user; and
storing content of the subsequent voice command in the profile of the user associated with the respective household user device.

10. The method of claim 1, further comprising storing the voice signature on all devices associated with the user associated with the respective household user device.

11. A system for identifying a user based on voice data and media consumption data, the system comprising:
a memory; and
a control circuitry configured to:
generate a voice signature from a voice command received via a user equipment device;
retrieve a table of entries, wherein each entry is associated with a voice signature of a user associated with a respective household user device;
(a) select one or more first entries from a plurality of entries;
(b) compare each field in the one or more first entries with a corresponding field associated with demographic information extracted from the voice command;
(c) determine whether any field of the one or more first entries matches the corresponding field associated with the demographic information extracted from the voice command;
based on the (a) selecting, (b) comparing, and (c) determining steps:
in response to determining that none of the fields in the one or more first entries match the corresponding field associated with the demographic information extracted from the voice command:
determine whether there are one or more second entries of the plurality of entries, wherein the one or more second entries that were not previously selected from the plurality of entries; and
in response to determining that a field of the one or more first entries matches the corresponding field associated with the demographic information extracted from the voice command:
store an indication of each field of the one or more first entries that matches the corresponding field of the demographic information extracted from the voice command, wherein the indication of each field is stored in the memory; and
identify two or more users associated with respective household user devices with a highest amount of matching demographics by comparing a number of matching fields in the one or more first entries.

12. The system of claim 11, wherein the control circuitry is further configured to:
compare each field in the one or more second entries with the corresponding field associated with the demographic information extracted from the voice command; and
determine whether any field of the selected second entry-one or more second entries matches the corresponding field associated with the demographic information extracted from the voice command.

13. The system of claim 11, wherein the control circuitry is configured to retrieve the table of entries by:
transmitting a request for user voice information that is associated with the user associated with the respective household user device; and
receiving a data structure containing the table with the plurality of entries.

14. The system of claim 13, wherein the control circuitry is configured to transmit the request for the user voice information that is associated with the user associated with the respective household user device by:
determining an identification string associated with the user equipment device where the voice command is received;
generating a query for the user voice information that is associated with the user associated with the respective household user device, wherein the query comprises the identification string; and
transmitting the query to a remote server that stores the user voice information that is associated with the user associated with the respective household user device.

15. The system of claim 11, wherein the fields of an entry include at least one of: a gender field, age range field or other demographic fields.

16. The system of claim 11, wherein the fields of an entry include binary or hexadecimal data representing the voice signature.

17. The system of claim 11, wherein the control circuitry is configured to identify the two or more users associated with the respective household user devices with the highest amount of matching demographics by:

retrieving a weight associated with each field of the one or more first entries, wherein each field is associated with demographic information;

calculating, using a respective weight for each field, for each user associated with the respective household user devices, the amount of demographic information of each field that matches the demographic information extracted from the voice command; and selecting the matching users associated with the respective household user devices with the highest amount of demographic information that matches.

18. The system of claim 11, wherein the control circuitry is configured to identify the two or more users associated with the respective household user devices with the highest amount of matching demographics by:

retrieving, from storage, a profile associated with each user of the respective household user device;

determining, based on the profile associated with each user of the respective household user device that a respective user has selected an avatar, wherein the avatar is visual representation of the respective user; and generating for display the avatar overlaid over a portion of a displayed media asset.

19. The system of claim 11, wherein the control circuitry is further configured to:

store in a profile associated with the user of the respective household user device, the voice signature of the user and an indication of a media asset referred to in the voice command;

detect a subsequent voice command;

determine that a subsequent voice signature of the user associated with the subsequent voice command matches the voice signature of the user; and store content of the subsequent voice command in the profile of the user associated with the respective household user device.

20. The system of claim 11, wherein the control circuitry is further configured to store the voice signature on all devices associated with the user associated with the respective household user device.

* * * * *